United States Patent
Gamil

(10) Patent No.: US 12,510,323 B1
(45) Date of Patent: Dec. 30, 2025

(54) SYSTEMS AND METHODS FOR CUSTOMIZING A FIREARM SURFACE

(71) Applicant: Haysam Gamil, Brandon, FL (US)

(72) Inventor: Haysam Gamil, Brandon, FL (US)

( * ) Notice: Subject to any disclaimer, the term of this patent is extended or adjusted under 35 U.S.C. 154(b) by 112 days.

(21) Appl. No.: 18/206,069

(22) Filed: Jun. 5, 2023

(51) Int. Cl.
| | |
|---|---|
| *F41A 35/00* | (2006.01) |
| *B23K 26/362* | (2014.01) |
| *B44C 3/00* | (2006.01) |
| *C25D 5/48* | (2006.01) |
| *B23K 101/34* | (2006.01) |

(52) U.S. Cl.
CPC ............ *F41A 35/00* (2013.01); *B23K 26/362* (2013.01); *B44C 3/00* (2013.01); *C25D 5/48* (2013.01); *B23K 2101/34* (2018.08)

(58) Field of Classification Search
CPC ... F41A 35/00; B23K 26/362; B23K 2101/34; B44C 3/00; C25D 5/48
See application file for complete search history.

(56) References Cited

FOREIGN PATENT DOCUMENTS

| CN | 110226820 A | * | 9/2019 | |
| WO | WO-2016074751 A1 | * | 5/2016 | ............ A41F 9/002 |

OTHER PUBLICATIONS

Transcript of Youtube video titled Seattle Engraving Center—SHOT Show Product Spotlight | SHOT Show 2022 available online in 2022 at https://www.youtube.com/watch?v=a8-CDhIH1T8.*

* cited by examiner

*Primary Examiner* — Robert S Walters, Jr.
(74) *Attorney, Agent, or Firm* — Newman Law, LLC

(57) ABSTRACT

Systems and methods for modifying the surface of a firearm, and more particularly, to systems and methods for customizing the surface of firearms, such as handguns, to include decorative and protective coatings and other enhanced decorative features.

9 Claims, 1 Drawing Sheet

SYSTEMS AND METHODS FOR CUSTOMIZING A FIREARM SURFACE

BACKGROUND OF THE INVENTION

Field of the Invention

This invention is generally concerned with systems and methods for modifying the surface of a firearm, and more particularly, to systems and methods for customizing the surface of firearms, such as handguns and rifles, firearm parts and components, such as magazines and slides, and firearm accessories, such as sights and grips, to include decorative and protective coatings and other enhanced decorative features.

Background of the Art

Firearms are often provided or customized to include decorative features on metallic parts, such as the slide, and/or on nonmetallic parts, such as the frame. There are a number of current techniques used by artisans to decorate and enhance such parts, such as engraving and coating, including chrome-plating, gold-plating, nickel-plating and nitriding.

Firearm artisans have up to now achieved the appearance of gold-color finishes by infusing a gold inlay technique, which is a manually exhaustive process done by hand. As a result, artisans were unable to cover much surface area of the gun and thus were instead only applying small elements of gold trim or minor accents to adorn the firearm surface. Engraving techniques have also been manually exhaustive, thus potentially limiting its application in addition to making such techniques more difficult, time-consuming and expensive.

In the course of their routine use, firearms, including accessories therefor, can be exposed to harsh environments that negatively impact both the internal components and outside surface. This is particularly true of handguns. IN addition to general wear and tear, handguns are exposed to external environmental conditions and substantially affected by the internal extremes of pressure, temperature, gas flow velocity, as well as wear when fired, all of which can accelerate damage of decorative features in addition to decreased reliability, especially when used frequently.

Therefore, systems and methods are needed which can provide custom decorative features to firearms, and in particular, handguns, which resist damage and provide enhanced resistance to corrosion and wear, all without compromising on the appealing cosmetic, decorative and personalized nature of such features.

SUMMARY OF THE INVENTION

Systems and methods of the invention are directed to solving the problems mentioned above, among others.

Some embodiments of the invention are directed to systems and methods for depositing a coating on parts of a firearm, which may comprise a metal, polymer or a combination thereof, using thin-film deposition methods, including physical deposition methods such as physical vapor deposition (PVD), sputtering, pulsed laser deposition and cathodic arc deposition, and/or chemical deposition methods such as plating, liquid plating, electroplating, chemical vapor deposition and chemical solution deposition.

In some embodiments, the method and system of the invention comprises steps whereby a film containing a noble metal, such as gold, is applied to coat a firearm surface layer via physical or chemical vapor deposition. The coating may be oxidized, through any suitable oxidation technique known in the art, such as heating or through an oxygen plasma treatment. Other metals and elements may be added, such as silver, platinum, chromium and zinc.

In some embodiments, the method and system of the invention comprises steps whereby plating techniques are used, such as electroplating techniques with a metal, such as chromium, to produce a metal coating on a firearm surface layer, and a gold-plating techniques involving the electrochemical plating.

In some embodiments, the method and system of the invention comprises steps whereby a firearm is dipped in liquid gold to deposit a thin layer of gold over the firearm surface layer.

In some embodiments, the method and system of the invention comprises steps whereby an engraving process, such as laser engraving, is used to create a decorative design on the firearm surface layer.

In some embodiments, the method and system of the invention comprises steps whereby portions of the firearm surface layer can be removed by etching or ablating, allowing a method for patterning the firearm surface layer with regions of differing surface properties. Etching can be carried out using a number of techniques well known to those skilled in the art, such as using an acid and/or an oxidizing agent and/or laser ablation.

In some embodiments, the method and system of the invention comprises steps whereby gemstones, such as a diamonds, rubies and sapphires, are adhered directly to firearm surface layer.

Some embodiments of the invention are directed to systems and methods of decorating a firearm surface involving the disposing a metal coating on the firearm surface, the improvement comprising physically modifying the metal coating layer disposed on the firearm surface prior to the hardening of the metal coating.

In some embodiments, the disposing of the metal coating on the firearm surface comprising metal plating, such as gold, silver, nickel or copper plating.

In some embodiments, the step of physically modifying the physically modifying the metal coating layer disposed on the firearm surface prior to the hardening of the metal coating further comprises an etching process.

In some embodiments, the etching process further comprises laser ablation.

In some embodiments, the step of physically modifying the metal coating layer disposed on the firearm surface prior to the hardening of the metal coating further comprises an engraving process.

In some embodiments, the engraving process further comprises laser engraving.

In some embodiments, the step of physically modifying the metal coating layer disposed on the firearm surface prior to the hardening of the metal coating further comprises a stone setting process. The stone setting process may further comprise carving one or more physical features in the metal coating layer to facilitate securing gemstones therein. The one or more physical features comprise cups, rims and/or tines.

Other features of embodiments of the invention will be apparent from the drawings taken in conjunction with the detailed description that follows.

BRIEF DESCRIPTION OF THE DRAWINGS

While the disclosure concludes with claims particularly pointing out and distinctly claiming specific embodiments, various features and advantages of embodiments within the scope of this disclosure may be more readily ascertained from the following description when read in conjunction with the accompanying drawings, some or all of which may or may not be drawn to scale, in which:

DETAILED DESCRIPTION OF SOME EMBODIMENTS OF THE INVENTION

Figure 1:
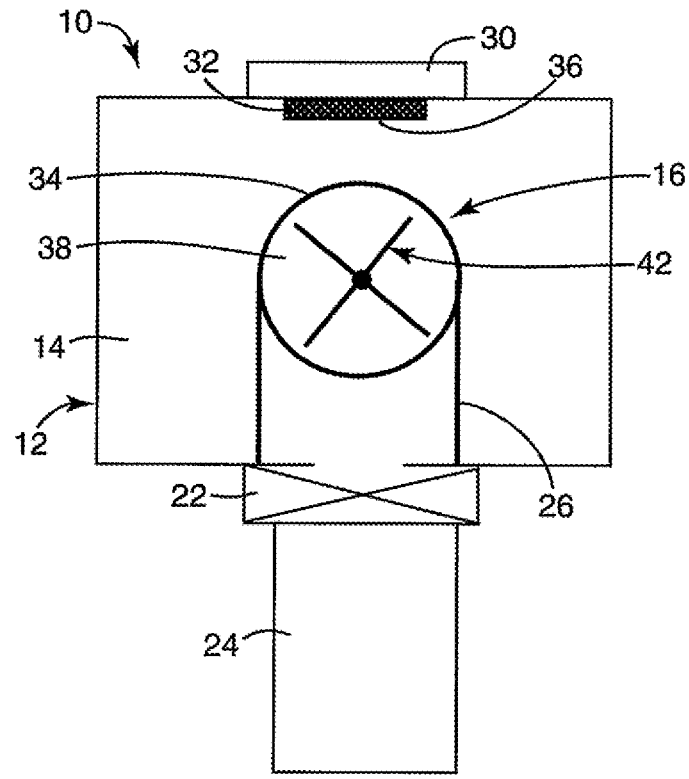
FIG. 1 is a schematic side view of an apparatus for carrying out a PVD process for depositing a catalytically active noble metal such as gold onto a firearm, such as a handgun.

The embodiments now will be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. In general, like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "including", "comprises", and/or "comprising," when used in this specification, specify the presence of stated features, steps, operations, elements, and/or components, but do not preclude the presence or addition of one or more other features, integers, steps, operations, elements, components, and/or groups thereof.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Methods of the present invention may be implemented by performing or completing manually, automatically, or a combination thereof, selected steps or tasks. The term "method" refers to manners, means, techniques, and procedures for accomplishing a given task including, but not limited to, those manners, means, techniques, and procedures either known to or readily developed from known manners, means, techniques, and procedures by practitioners of the art to which the invention belongs. The descriptions, examples, methods, and materials presented in the claims and the specification are not to be construed as limiting but rather as illustrative only. Those skilled in the art will envision many other possible variations within the scope of the technology described herein.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In this description, various aspects of selected embodiments are described. However, it will be apparent to those of ordinary skill in the art and others that alternate embodiments may be practiced with only some or all of the aspects. For purposes of explanation, specific numbers, materials and configurations are set forth in order to provide a thorough understanding of the embodiments. However, it will be apparent to those of ordinary skill in the art and others that alternate embodiments may be practiced without the specific details. In some instances, well-known features are omitted or simplified in order not to obscure the illustrated embodiments.

Various operations may be described herein as multiple discreet steps in turn, in a manner that is helpful to understanding of the embodiments. However, the order of description should not be construed to imply that these operations are necessarily order dependent. In particular, these operations may not be performed in the order of presentation.

While some embodiments of the invention will be described with respect to gold, it should be understood that the principles of the invention are applicable to other materials, such as other metals, noble metals and alloys, like chrome, nickel, silver and platinum or combinations thereof. It should also be understood that references to firearms or handguns herein in the context of the exemplary systems and methods of the invention also includes firearm and handgun parts and components, such as magazines and slides, and firearm and handgun accessories, such as sights and grips.

In an exemplary embodiment, catalytically active gold is deposited onto the surface layer of a firearm using PVD. In the method of the invention, gold is transferred from a gold-containing source or target to the firearm surface layer. The transfer may include atom-by-atom transfer and deposition of the gold or the transfer of gold as extremely fine bodies constituting more than one atom per body. Once at the firearm surface layer, the gold may interact with the surface physically, chemically, ionically, and/or otherwise.

In the method of the invention, the PVD of the invention occurs under temperature and vacuum conditions in which the gold is made "mobile" to facilitate the migration thereof on the surface layer of the firearm until being "immobilized" by adhering to the surface layer. The PVD of the invention may include sputter deposition, evaporation, and cathodic arc deposition. Any of these or other PVD approaches may be used, although the nature of the PVD technique used can impact the catalytic activity of the gold which further facilitates the adhering of the gold onto the firearm surface layer.

Although generally, only the exposed surface layer of the firearm will be coated, gold atoms can migrate such as by diffusion some moderate distance into the surface layer to provide gold particles in the firearm surface layer pores in the region immediately adjacent to the coated surface layer. The penetration depth is generally small, such as no more than 50 nm, but depends on the relative porosity of the firearm surface layer.

Figure 2:
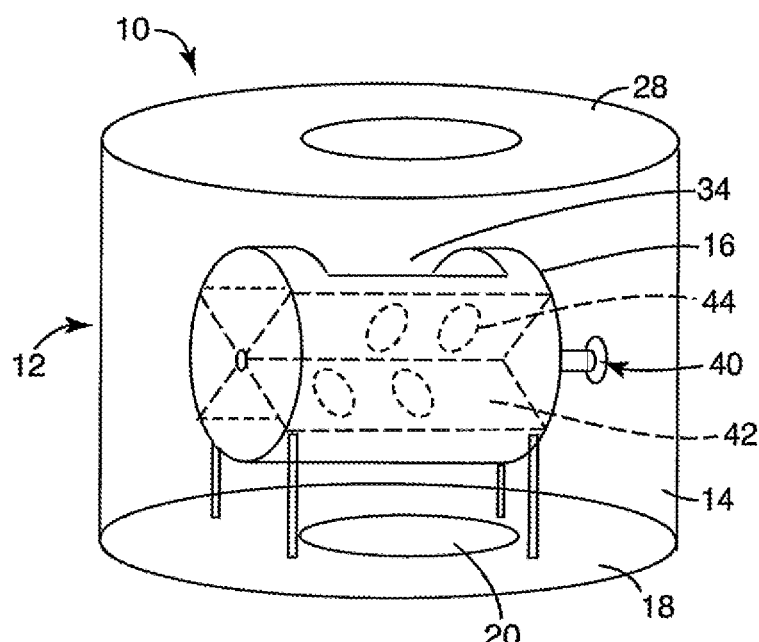
FIG. 2 is a schematic perspective view of the apparatus of FIG. 1.

An apparatus 10 for carrying out systems and methods of the invention is shown in FIGS. 1 and 2. Apparatus 10 includes a housing 12 defining a vacuum chamber 14 containing a particle agitator 16. Base 18 contains a port 20 for a high vacuum gate valve 22 connected with diffusion pump 24 and a support 26 for supporting particle agitator 16. Chamber 14 is capable of being evacuated to background pressures in various ranges suitable for performing processes such as the PVD treatment disclosed herein.

Housing 12 is in communication with a sputter deposition source 30. A firearm 32 is fastened to act as the target of the gold sputtering process. Particle agitator 16 includes an opening 34 in top 36. The opening 34 is positioned below the surface 36 of firearm 32 so that sputtered gold atoms can enter the agitator volume 38. The agitator 16 is fitted with a shaft 40 aligned with its axis. The shaft 40 has a rectangular cross section to which are bolted four rectangular blades 42 which form an agitation mechanism or paddle wheel for the support particles being tumbled. The blades 42 each contain holes 44 to promote communication between the particle volumes contained in each of the quadrants formed by the blades 42 and agitator cylinder 16. The dimensions of the blades 42 are selected to provide desirable gap spacing within agitator walls 48. Operating temperatures may be below about 150C and even below 50C.

A firearm or firearm component may be first dried and heated before being placed in apparatus 10. Chamber 14 is then evacuated. Once the chamber pressure is in a desirable range, a gas such as argon is fed into chamber 14. The gold deposition process is then started by applying a cathodic power. The particle agitator shaft 40 is rotated during the gold deposition process. The chamber 14 is backfilled with air. Firearm 32 will have an amount of gold deposited thereon.

Surface treatments of the invention may further include a metal plating process, such as gold-plating and nickel-plating using techniques including electrolytic plating, immersion plating, and electroless plating (chemical or autocatalytic plating) involving the production of a coating from solutions of metal ions.

In some embodiments of the invention, a nickel-based finish is produced on a firearm substrate by plating techniques for nickel and nickel alloys. The nickel-based finish may be pure nickel (99.99% pure) or nickel alloyed or combined with other elements such as cobalt, boron, and phosphorus. In some embodiments, the nickel is present to the extent of at least 85% by weight. Phosphorus may be in amount less than 6% by weight of the nickel-based finish. A nickel-based coating of the invention may include nickel (99.99%), nickel/cobalt/phosphorus (85/10/5 by weight, respectively), nickel/phosphorus (95/5 by weight, respectively), and nickel/boron (99/1 by weight, respectively). Various thicknesses of a nickel-based coating may be obtained through methods of the invention. A typical thickness of a nickel-based coating may be between about 250 and about 375 nanometers.

A bath for obtaining a nickel/phosphorus metal finish on a firearm as a surface treatment according to the invention may contain nickel chloride, sodium citrate, ammonium bifluoride, and sodium hypophosphate. Substituting dimethyl amine borane for sodium hypophosphate yields a nickel/boron metal finish. The addition of nickel cobalt will introduce cobalt into the nickel-based finish. A firearm on which the nickel-based finish is applied may be plastic, polymer, steel, aluminum, nickel, nickel/steel, or any other substrate capable of being nickel-plated.

A surface treatment preparation for gold plating according to the invention involves degreasing the firearm surface by washing with a suitable solvent such as methylene chloride, rinsing with an acid solution followed by extensive water rinsing, and treatment with a solution of potassium cyanide containing hydrogen peroxide, followed by rinsing in deionized water. The prepared firearm substrate is then ready for the plating bath. The plating component of the bath is one or more water soluble monovalent gold compounds, exemplary of which are potassium gold cyanide, gold chloride, and gold citrate. A buffering component may also be included as part of the bath. Suitable buffering agents include a mixture of sodium bicarbonate and ammonium hydroxide, ammonium bifluoride, ammonium citrate, and salts of carboxylic acid. The buffering component is added to the solution of the plating component.

The firearm surface to be plated is immersed in the bath maintained at a constant temperature, preferably about 90° to 95° C. Agitation is initially vigorous, and then reduced for the plating period. After completion of the plating process, the plated firearm surface is rinsed. Various thicknesses of a gold plating may be obtained. A typical gold-based coating may be about 250 nanometers thick.

In some embodiments, metal plating methods may include other steps such as rinse and acid activation steps for plating different variations depending on the desired results, such as brightness, shine or coloring. For example, the plating methods may be used to dispose coatings of bright or black nickel or copper, rose-colored gold, as well as bluing and black passivating.

Systems and method of the invention also include plating a firearm surface using at least three steps, the first of which is scouring to prepare the surface for pre-metallization which may involve the use of aqueous cleaning solution and removal of debris and/or to remove any coatings or film on the firearm surface that may interfere with metallization. Once the firearm surface has been sufficiently scoured, the substrate is contacted with an aqueous, pre-metallization solution, also known as a sensitizing solution, which may include as a metallic salt and acid. Once the firearm surface has been pre-metallized, the substrate is preferably washed to remove excess solution from the firearm surface that can interfere with subsequent metallization. Plating is thereafter accomplished by contacting the pre-metallized firearm surface with an aqueous metallic salt solution to effect deposition of a metal oxide on the firearm surface. For example, the aqueous metallic salt solution may be a silver, nickel, copper or gold oxide. The deposited metal oxide is converted, that is, reduced, to a metal by contacting the firearm surface with a reducing agent thereby effecting the formation of a metal coating on the firearm surface.

It should be understood that one or more plating techniques may be used in combination and multiple coatings and/or a buffer layer may be applied to the firearm surface.

Once a metal layer is disposed on the surface, it may be allowed to dry. In some embodiments, the surface layer may be further modified before the layer is fully hardened, as the not yet fully hardened surface layer may advantageously be more readily modifiable using the surface modification techniques described herein below.

While the above disclosure provides an exemplary embodiment of treatment systems and methods for modifying all or portions of the surface layer of a firearm or a firearm component, it should be understood that other treatment systems and methods, including any of those described herein, such as plating, may be employed to modify the surface layer.

Either before, instead of, or after a surface layer treatment is applied resulting in the formation of a coating over the firearm surface layer, the systems and methods of invention may further comprise surficial modification treatments and procedures such as stone setting and engraving may then be applied to firearm 32 as well as laser engraving. In particular embodiments, the coating layer further advantageously enables certain stone setting implementations, which involve the carving or modifying of the surface layer to create physical surface features which facilitate securing gemstones thereto, such as any of cups, ribs, prongs, grooves, channels, notches, rims and/or tines, or combinations thereof, which may be defined in the newly added coating on the surface layer. Stone setting may also involve soldering and adhesives, among other things, which are further advantageously facilitated by the addition of the coating layer on the firearm surface layer. Stone setting according to the invention may also include pave, channel and bezel settings.

In some embodiments, advantages are realized by imparting the surficial modification treatment within a certain period of time of a surface layer being disposed on the firearm. In some embodiments, the period of time comprises one week or less, and in certain embodiments the modification of the surface, such as by laser engraving and stone setting, occurs very soon, such as within a few days or even immediately after the surface layer treatment.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

This written description uses examples to disclose the invention and also to enable any person skilled in the art to practice the invention, including making and using any devices or systems and performing any incorporated methods. The patentable scope of the invention may include other examples that occur to those skilled in the art. Other aspects and features of the invention can be obtained from a study of the drawings and the disclosure. The invention may be practiced otherwise than as specifically described herein. It should also be noted, that the steps and/or functions listed herein, notwithstanding the order of which steps and/or functions are listed, are not limited to any specific order of operation.

While exemplary apparatus, systems and methods of the invention have been described herein, it should also be understood that the foregoing is only illustrative of a few particular embodiments with exemplary and/or preferred features, as well as principles of the invention, and that various modifications can be made by those skilled in the art without departing from the scope and spirit of the invention. Therefore, the described embodiments should not be considered as limiting of the scope of the invention in any way. Accordingly, the invention embraces alternatives, modifications and variations which fall within the spirit and scope of the invention as set forth herein, in the claims and any equivalents thereto.

The invention claimed is:

1. An improvement to a method of decorating a firearm surface involving disposing a metal coating on the firearm surface, the improvement comprising physically modifying the metal coating layer disposed on the firearm surface prior to a step of hardening of the metal coating, the physical modifying comprising a stone setting process, the stone setting process comprising the step of carving a plurality of physical features in the metal coating layer to facilitate securing gemstones therein, wherein the plurality of physical features comprise at least one of each of a cup, a rim and a tine.

2. The improvement of claim 1, wherein the disposing of the metal coating on the firearm surface comprises metal plating.

3. The improvement of claim 2, wherein the metal plating further comprises gold plating.

4. The improvement of claim 2, wherein the metal plating further comprises silver plating.

5. The improvement of claim 2, wherein the metal plating further comprises nickel plating.

6. The improvement of claim 1, wherein the step of physically modifying the metal coating layer disposed on the firearm surface prior to the hardening of the metal coating further comprises an etching process.

7. The improvement of claim 6, wherein the etching process further comprises laser ablation.

8. The improvement of claim 1, wherein the step of physically modifying the metal coating layer disposed on the firearm surface prior to the hardening of the metal coating further comprises an engraving process.

9. The improvement of claim 8, wherein the engraving process further comprises laser engraving.

* * * * *